United States Patent [19]

Kagawa

[11] Patent Number: 5,195,174
[45] Date of Patent: Mar. 16, 1993

[54] IMAGE DATA PROCESSING APPARATUS CAPABLE OF COMPOSING ONE IMAGE FROM A PLURALITY OF IMAGES

[75] Inventor: Hideaki Kagawa, Tokyo, Japan

[73] Assignee: Kabushiki Kaisha Toshiba, Kanagawa, Japan

[21] Appl. No.: 557,001

[22] Filed: Jul. 25, 1990

[30] Foreign Application Priority Data

Jul. 28, 1989 [JP] Japan .................. 1-195689

[51] Int. Cl.⁵ .............................. G06F 15/62
[52] U.S. Cl. .................... 395/102; 395/109; 395/115; 395/145; 395/148; 395/157
[58] Field of Search ................. 364/518–522; 395/153

[56] References Cited

U.S. PATENT DOCUMENTS 4,802,104 1/1989 Ogiso .................. 395/153

FOREIGN PATENT DOCUMENTS 60-19355 1/1985 Japan .
63-70666 3/1988 Japan .
63-272267 11/1988 Japan .

*Primary Examiner*—Gary V. Harkcom
*Assistant Examiner*—Almis Jankus
*Attorney, Agent, or Firm*—Finnegan, Henderson, Farabow, Garrett and Dunner

[57] ABSTRACT

An image data processing apparatus including a scanner for individually reading first and second image information from first and second documents, a page memory for storing the first image information into its first memory area, a display device for displaying a first image corresponding to the first image information stored in the first memory area of the page memory, a keyboard or a mouse for defining a desired range to be substituted with a second image corresponding to the second image information, in the first image displayed on the display device, a CPU for determining a magnifying ratio of the second image suited to the desired range, according to the sizes of the desired range and the second image, an enlargement/reduction circuit for magnifying the second image in response to the magnifying ratio determined by the CPU and the CPU for further processing a storage of the second image information read by the scanner into a second memory area corresponding to the desired range in the first memory area, according to the magnifying ratio.

6 Claims, 3 Drawing Sheets

IMAGE DATA PROCESSING APPARATUS CAPABLE OF COMPOSING ONE IMAGE FROM A PLURALITY OF IMAGES

FIELD OF THE INVENTION

The present invention relates generally to an image data processing apparatus, and more particularly, to an image data processing apparatus such as a document image filing apparatus.

BACKGROUND OF THE INVENTION

Recently, a document image filing apparatus has been put in practical use which reads image data, such as documents created in large quantities through two-dimensional scanning by a two-dimensional scanner, stores this read image data on an optical disc, retrieves and reads optional stored image data, and outputs them in a visible state through an output device, for instance, a CRT (Cathode Ray Tube) display device or a printer using an interface.

When it is desirable to combine a reduced image of a document into an image of another document using such an apparatus, image data of one of the documents is read with a scanner and stored in a page memory which is an image memory, and is displayed on a CRT display device. Image data of the other document is read with the scanner, stored in the other region of the image memory, and is displayed on the CRT display device.

A designation is given to reduce the image of the other document at a desired reduction rate, and after executing the reduction process accordingly, the image stored in the region is updated to the reduced size and displayed on the CRT display device. Thereafter, a superimposition with the image of another document is designated. The reduced image stored in the other region is stored in the designated position is the first region according to the designation and then displayed on the CRT display device. Thus, edited images composed of the reduced image of one document superimposed on the image of another document are obtained.

However, such an apparatus has a defect in that the image editing operation is complicated, many image memory areas are needed, and image memory cannot be used efficiently.

SUMMARY OF THE INVENTION

It is, therefore, an object of the present invention to provide an image data processing apparatus which assures efficient image editing operation.

Another object of the present invention is to provide an image data processing apparatus which is able to reduce the size of image memory areas to be used and makes efficient use of image memory.

In order to achieve the above object, an image data processing apparatus according to one aspect of the present invention includes a scanner for individually reading first and second image information from first and second documents, a page memory for storing the first image information into its first memory area, a display device for displaying a first image corresponding to the first image information stored in the first memory area of the page memory, a keyboard or a mouse for defining a desired range to be substituted with a second image corresponding to the second image information, in the first image displayed on the display device, a CPU for determining a magnifying ratio of the second image suited to the desired range, according to the sizes of the desired range and the second image, an enlargement/reduction circuit for magnifying the second image in response to the magnifying ratio determined by the CPU and the CPU for further processing a storage of the second image information read by the scanner into a second memory area corresponding to the desired range in the first memory area, according to the magnifying ratio.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
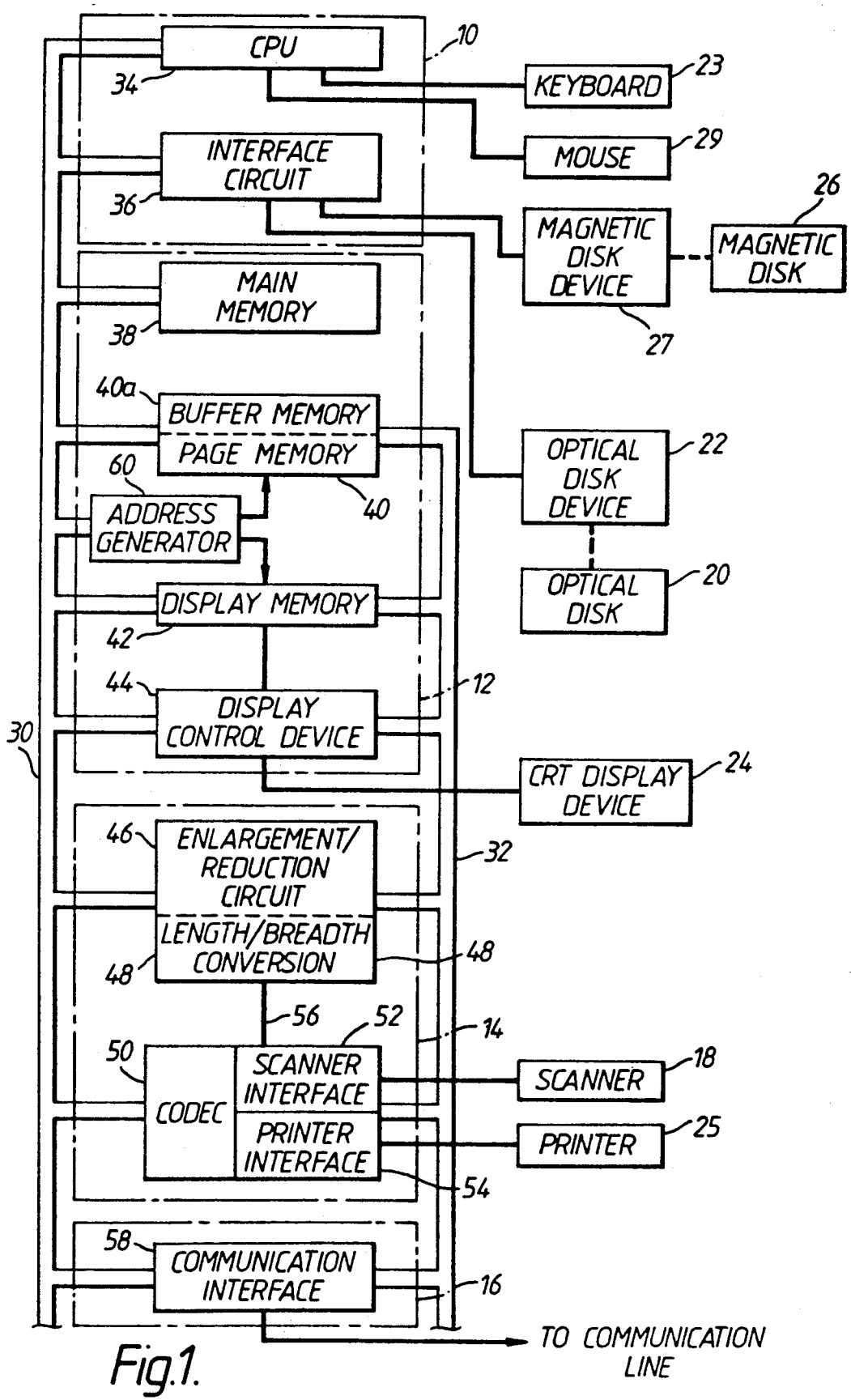
FIG. 1 is a block diagram briefly showing the general construction of the image data processing apparatus.

The present invention will be described in detail with reference to the FIGS. 1 through 5. Throughout the drawings, like or equivalent reference numerals or letters will be used to designate like or equivalent elements for simplicity of explanation.

Referring now to FIG. 1, the general construction of the image data processing apparatus will be briefly explained before a detailed description of the present invention is presented.

FIG. 1 is a block diagram showing the general construction of the image data processing apparatus. The image data processing apparatus comprises a control module 10, a memory module 12, an image processing module 14, a communication control module 16, a scanner 18, an optical disc 20 and an optical disc device 22, a keyboard 23, a CRT display device 24, a printer 25, a magnetic disc 26, a magnetic disc device 27, a mouse 29, a system bus 30 and an image data bus 32.

The control module 10 comprises a CPU (Central Processing Unit) 34 which performs various processes such as storage, retrieval and editing of image data, etc. and the interface circuit 36 which connects the optical disc device 22 and the magnetic disc device 27 to the CPU 34.

The keyboard 23 and the mouse 29 are connected to the CPU 34. The keyboard, mouse, and CPU together form a means for defining the size and orientation of image data to be displayed. The interface circuit 36 includes a DMA (Direct Memory Access) channel and its associated circuits and transfers data at high speed between the optical disc device 22 or the magnetic disc device 27 and memories in the memory module 12, the image processing module 14 or the communication control module without involving the CPU 34.

The memory module 12 comprises a main memory 38 which stores various processing programs (which perform operations such as storage, retrieval, editing, etc. of image data and control data, etc.), a page memory 40 (which is an image memory having a storage capacity corresponding to image data of several pages of A4 standard size document) which acts as a storage means to store the page image data, the display memory 42 as a display interface, and the display control device 44.

A part of the page memory 40 is allocated to the buffer memory region 40a. Write/read to/from this buffer memory region 40a is controlled by an unillustrated counter. The page memory 40 is a memory for temporarily storing, for instance, image data to be stored in or read out of the optical disc 20. In the display memory 42, image data to be displayed in the display window (not shown) which is formed in the CRT display device 24, that is, magnified to enlarge or reduce, rotated, superimposed or reversed black and white image data of the page memory 40, are stored. The display control device 44 controls the display process of the CRT display device 24.

The image processing module 14 comprises the enlargement/reduction circuit 46 which performs enlargement/reduction of image data, the length and breadth conversion circuit 48 which performs a rotating of the image data by length and breadth conversion of the image data, the compression/expansion circuit (CODEC) 50 which performs the encode process by compressing (reduce redundancy) and expanding (restore the reduced redundancy), the scanner interface 52 for the scanner 18, the printer interface 54 for the printer 25 and the internal bus 56 which connects the enlargement/reduction circuit 46 and the length and breadth conversion circuit 48, the compression/expansion circuit 50, the scanner interface 52 and the printer interface 54.

The communication control module 16 comprises the communication interface 58, which supplies retrieval data transmitted through the communication line to the main memory 38 and transmits the image data corresponding to the received retrieval data. Further, it supplies image data to be stored in the optical disc 20 to the page memory 40 and, at the same time, supplies retrieval data corresponding to the image data to the main memory 38. The details of the communication interface 58 will be described later.

The system bus 30 is the bus for transmitting/receiving control data among the modules and connects the control module 10, the memory module 12, the image process module 14 and the communication control module 16. The image data bus 32 is the bus for transmitting/receiving image data and connects the memory module 12, the image process module 14 and the communication control module 16.

The scanner 18 is, for instance, a two-dimensional scanner which generates electric signals corresponding to image data on a document by scanning the surface of the document two-dimensionally with laser beam light. This scanner functions as a reading means for reading an image formed on a document.

The optical disc device 22 stores image data read by the scanner 18 in the optical disc 20 successively and retrieves image data corresponding to retrieval data designated by the keyboard 23, etc., from the optical disc 20.

The keyboard 23 is used to input peculiar retrieval data corresponding to image data to be stored in the optical disc 20 and various operating commands such as storage, retrieval, edit process, etc. Further, the mouse 29 is used to select or direct the display content at the position where the cursor is positioned (for example, various operation modes, defining of range for edited image or icon) by giving an instruction at a desired position by moving the cursor (not shown) being displayed on the display window of the CRT display device 24 in the vertical and horizontal directions.

The CRT display device (Cathode Ray Tube display device) 24 operates to display image data read by the scanner 18 or retrieved from the optical disc 20. This CRT display device 24 is a multi-window type display device which has, e.g., four windows (not shown) formed in the display area so that four different sets of image data can be displayed simultaneously. Each set of the image data displayed on each window can be enlarged, reduced, rotated or scrolled independently.

The printer 25 is to print and output (hard copy) image data read through the scanner 18, retrieved from the optical disc 20, or displayed on the CRT display device 24.

The magnetic disc device 27 stores various process programs in the magnetic disc 28 which is loaded on this magnetic disc device 27 and further, stores retrieval data composed of retrieval data input from the keyboard 23 and storage address, image size, etc. on the optical disc 20 in which image data corresponding to the retrieval data is stored.

Figure 2:
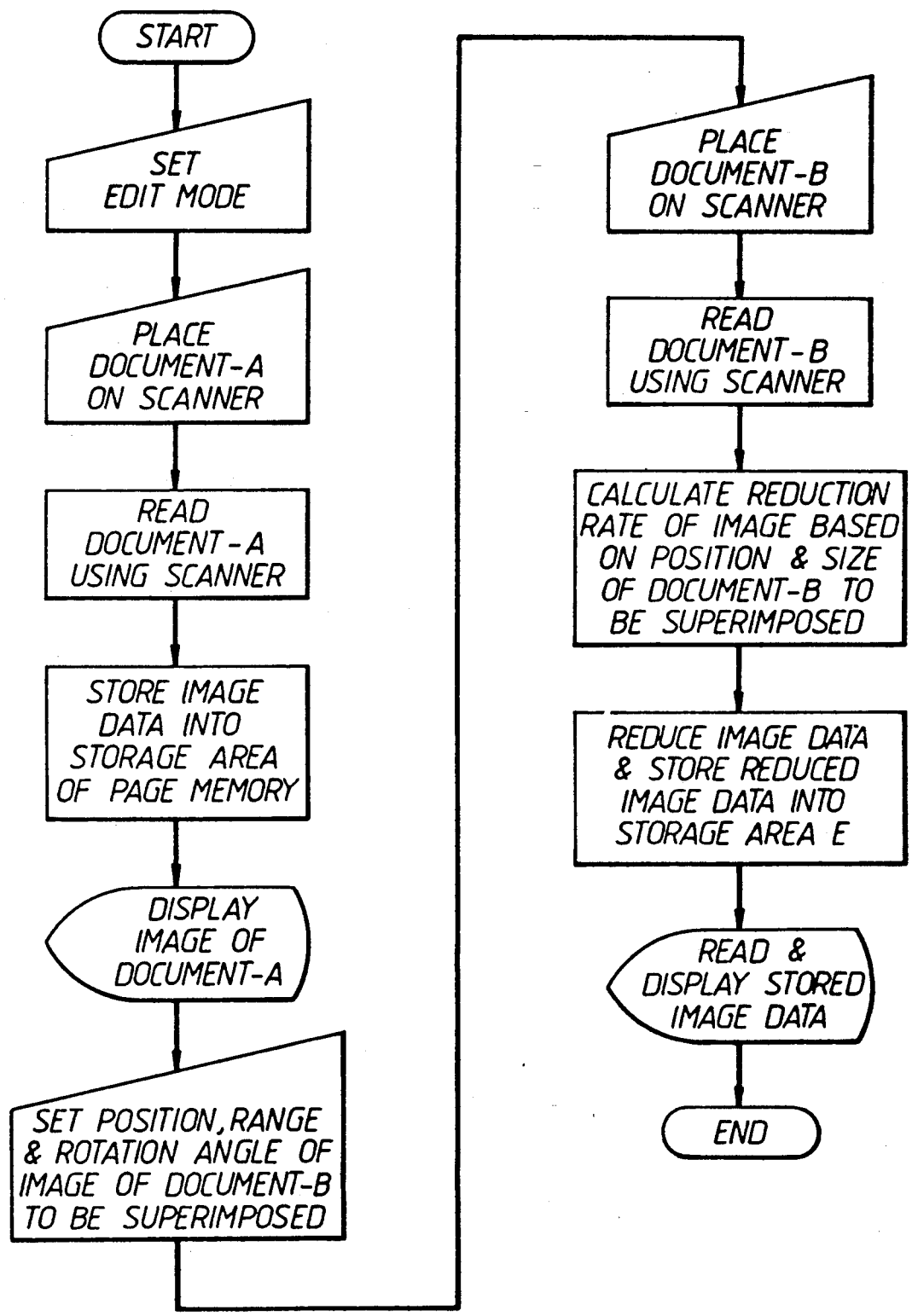
FIG. 2 is a flowchart for illustrating the process for editing images of documents.
Figure 3:
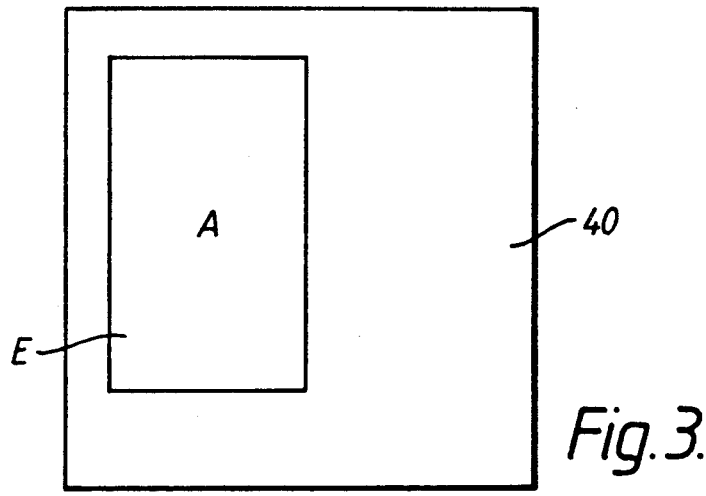
FIGS. 3 and 4 are diagrams showing examples of storage area in image memory.

Now, the image edit processing operation of the image data processing apparatus will be explained hereinafter referring to the flowchart shown in FIG. 2. The editing process, for instance, to superimpose a reduced image of document B (A4 standard size) read by the scanner 18 onto the image of the document A (A4 standard size) also read by the scanner 18 will be explained.

Now, for instance, the edit mode is selected and set through the keyboard 23 for two documents A and B that are read by the scanner 18, and placing the document A on the scanner 18, it is directed to read the image of the document A through the keyboard 23. The scanner 18 is then operated by the CPU 34, the scanner 18 scans the image of this set document A two-dimensionally and photoelectrically converts it into image data. This photoelectrically converted image line data is stored successively in the storage area E in the page memory 40 shown in FIG. 3. The A4 standard size space is secured for the storage area E in the page memory 40 corresponding to the size of the document A that is read by the scanner 18. The image of the document A stored in the storage area E of the page memory 40 is stored in the display memory 42 and displayed on the CRT display device 24. The desired superimposing position, superimposing range, and rotating angle of the image of the document B are set up by tracing the image being displayed on the CRT display device 24 using the mouse 29.

Then, placing the document B on the scanner 18, it is directed to read the image of the document B through the keyboard 23. The CPU 34 operates the scanner 18 to scan the image of the set document B two-dimensionally and photoelectrically convert the image into image data. In this case, the CPU 34 calculates a reduction rate of the image based on the defined superimposing range of the image of the document B and its image size read by the scanner 18.

Figure 4:
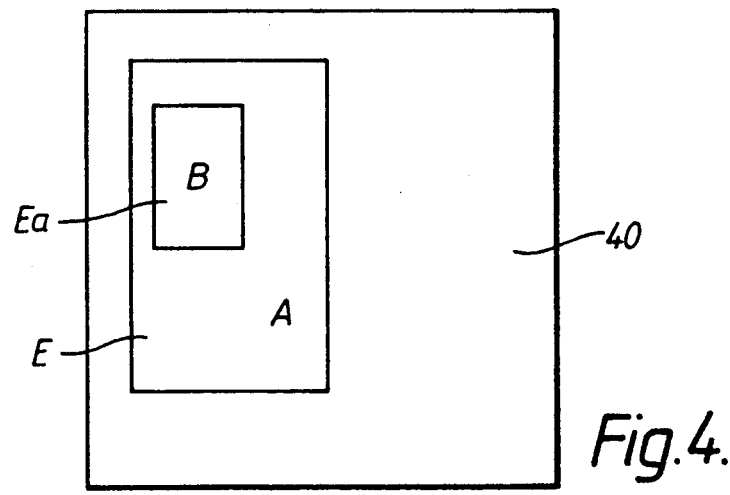
Figure 5:
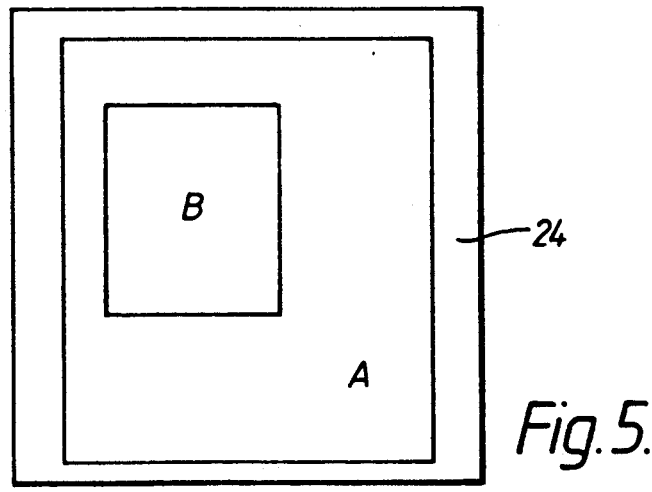
FIG. 5 is a diagram showing an example of display on CRT display device.

The line data of the image photoelectrically converted by the scanner 18 is reduced at the reduction rate through the enlargement/reduction circuit 46, and stored in order in a selected area Ea in the storage area E of the page memory 40, shown in FIG. 4. The selected area Ea is determined according to the superimposing position and the superimposing range defined by the mouse 29. The image of the document A and the reduced image of the document B which have been superimposed and stored in the storage area E of the page memory 40 are then stored in the display memory 42 and displayed on the CRT display device 24 as shown in FIG. 5.

Further, in the case where rotation of the image of the document B is designated, the images reduced through the enlargement/reduction circuit 46 are rotated using the length and breadth conversion circuit 48 and then are stored in order in the selected area Ea in the storage area E of the page memory 40.

As described above, the number of image edit processes involved in combining the reduced image of document B into the image of document A is reduced and it is therefore possible to promote efficiency of the image editing operation and reduce its time consumption. Further, when editing two documents in A4 standard size, 2 areas in A4 standard size had been needed in the image memory in the past, but now, only one A4 standard size area is required in the image memory. Because of this, the image memory can be used for other applications, for instance, for storage of character data, proceeding images, etc. or as a memory for CPU. As a result, the areas of the image memory used in editing is reduced and the image memory can be efficiently used.

Further, two images can be edited even when one of the image sizes is the same as the storage capacity of the image memory.

As described above in detail, according to the present invention it is possible to provide an image data processing apparatus which increases the efficiency of the image editing operation and reduces its time consumption, and also assures efficient use of the image memory. Thus, the present invention can provide an extremely preferable image data processing apparatus.

While there have been illustrated and described what are at present considered to be the preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. An image data processing apparatus for composing an image from a plurality of document images, comprising:

means for separately scanning a first document image with a first size and for scanning a second document image with a second size smaller than the first size, and for obtaining first and second image information corresponding to the first and second document images, respectively;

storage means including a first storage area having at least a storage capacity corresponding to the first size for storing the first image information obtained by the scanning means;

first writing means for writing the first image information obtained by the scanning means into the first storage area of the storage means;

display means for displaying the stored first image information in the first storage area of the storage means;

defining means for defining a prescribed range within the displayed first document image, the prescribed range having a third size smaller than the first size;

determining means for determining a magnifying ratio for magnifying the second document image from the second size to the third size;

magnifying means for magnifying the second document image obtained by the scanning means by the magnifying ratio determined by the determining means; and second writing means for writing the magnified second document image into a second storage area of the storage means corresponding to the prescribed range defined by the defining means.

2. An image data processing apparatus of claim 1, wherein the magnifying means includes image enlarging means for enlarging the size of the second image.

3. An image data processing apparatus of claim 1, wherein the magnifying means includes image reducing means for reducing the size of the second image.

4. An image information processing method for composing an image from a plurality of document images, comprising the steps of:

scanning a first document image having a first size;

writing the first document image obtained by the scanning step into a first storage area of a storage means having at least a storage capacity corresponding to the first size;

displaying the first document image stored in the first storage area of the storage means;

defining a prescribed range within the displayed first document image, the prescribed range having a second size smaller than the first size;

scanning a second document image having a third size which is smaller than the first size;

determining a magnifying ratio for magnifying the second document image obtained by the second document image scanning step from the third size to the second size;

magnifying the second document image by the magnifying ratio determined by the determining step; and writing the magnified second document image into a second storage area of the storage means corresponding to the prescribed range defined by the defining step.

5. A method of claim 4, wherein the magnifying step includes enlarging the size of the second image.

6. A method of claim 4, wherein the magnifying step includes reducing the size of the second image.

* * * * *